July 6, 1954
J. A. MALACHICK
2,683,063
PNEUMATIC COAL CONVEYER
Filed July 19, 1951
2 Sheets-Sheet 1
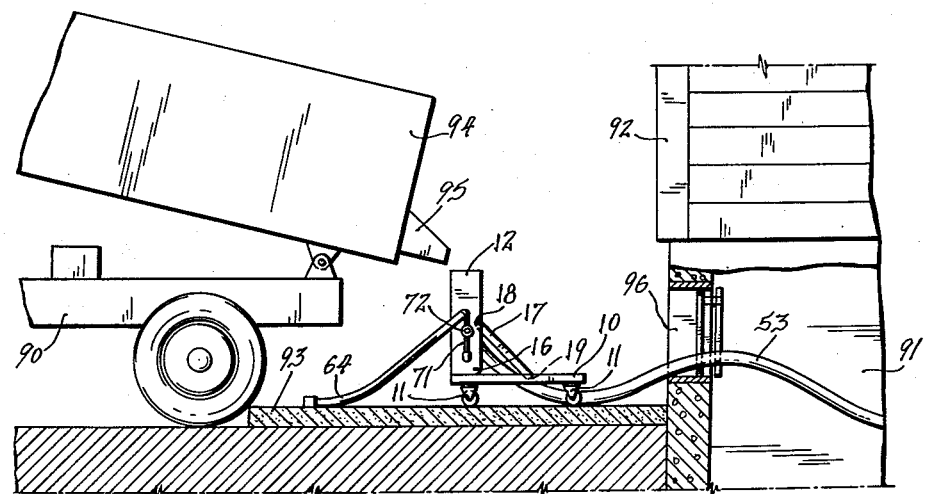
Fig. 1.
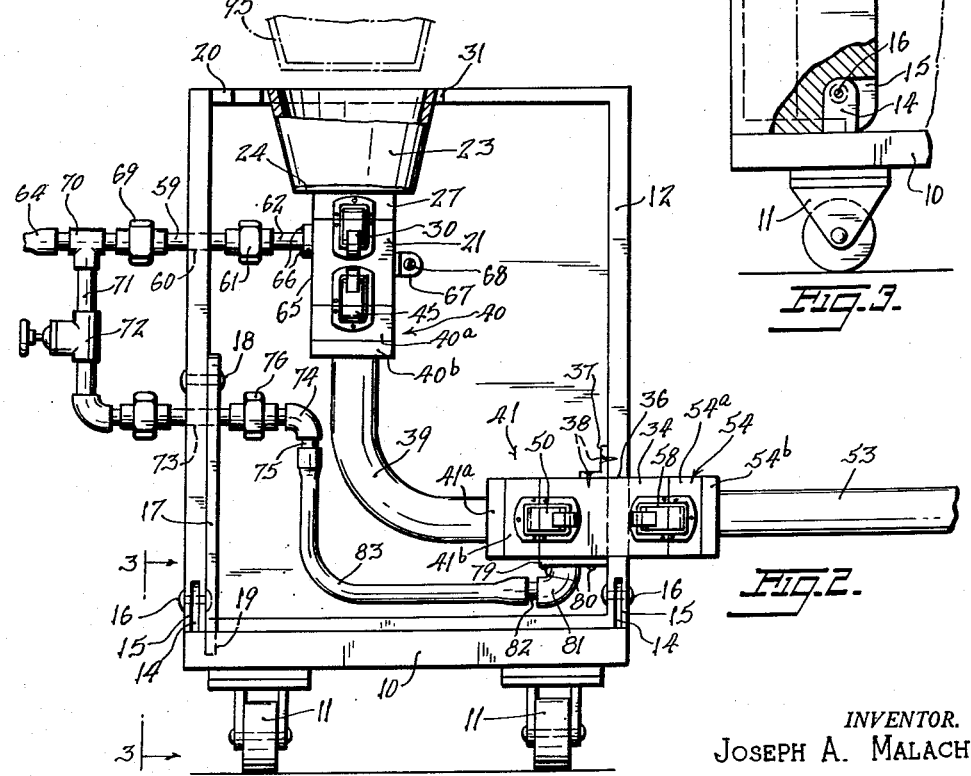
Fig. 2.
Fig. 3.
INVENTOR.
JOSEPH A. MALACHICK
BY
ATTORNEY July 6, 1954  J. A. MALACHICK  2,683,063
PNEUMATIC COAL CONVEYER
Filed July 19, 1951  2 Sheets-Sheet 2

INVENTOR.
JOSEPH A. MALACHICK
BY
*[signature]*
ATTORNEY

Patented July 6, 1954

2,683,063

UNITED STATES PATENT OFFICE 2,683,063

PNEUMATIC COAL CONVEYER

Joseph A. Malachick, New York, N. Y.

Application July 19, 1951, Serial No. 237,617

5 Claims. (Cl. 302—17)

This invention relates to new and useful improvements in a pneumatic conveyor for material in a finely divided form.

More specifically, the present invention proposes the construction of a pneumatic conveyor designed to expedite the handling of coal of small sizes, such as buckwheat and pea, by conveying the coal from a delivery truck located outside of a building through a cellar window and permit its convenient discharge evenly throughout the usual coal bin without having the coal stack itself directly in front of the window.

Another object of the present invention proposes constructing the conveyor as a mobile unit so that it can be positioned at a suitable location to have the coal spilled into its hopper to be led by the conveyor to a flexible discharge tube which can be manually held at its free end for guiding the discharge of the coal into the desired locations within the coal bin.

Still further, the present invention proposes constructing the pneumatic conveyor to have an upright housing within which there is mounted a tubular entrance block upon which the hopper is mounted in a manner to receive the coal from the delivery truck.

The present invention further proposes mounting a discharge block within the housing from which the flexible discharge tube is extended and which is connected with the entrance block by a tube and through which the coal is to pass from the entrance block to the discharge block.

A further object of the present invention proposes mounting the housing pivotally upon a wheeled platform in a manner so that the housing can be pivoted to an upright operative position with its hopper uppermost to receive the coal or so that the housing can be lowered to an inoperative position on the platform reducing the size thereof to be conveniently carried when not in use on the coal delivery truck.

Still another object of the present invention proposes the provision of means whereby either the entrance block, the discharge block or both can be connected to a source of air under pressure carried on the coal delivery truck for supplying compressed air into those blocks in a manner to force the material through the conveyor to discharge from the flexible discharge tube.

While the pneumatic conveyor of the present invention is intended chiefly for the handling of coal in small sizes, it is appreciated that the same can be used for handling other finely divided materials, such as sand, crushed stone, gravel, grains—oat, wheat, barley—and the like.

It is a further object of the present invention to construct a pneumatic conveyor for material in a finely divided form which is simple and durable, which is efficient for its intended purpose and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of the pneumatic conveyor of the present invention as it appears when in use for conveying coal from a delivery truck to a coal bin in the cellar of a building.

Fig. 2 is an elevational view of the conveyor looking from the right side of Fig. 1.

Fig. 3 is an enlarged detailed view looking in the direction of the line 3—3 on Fig. 2, but with parts thereof broken away to reveal interior construction.

Figure 4:
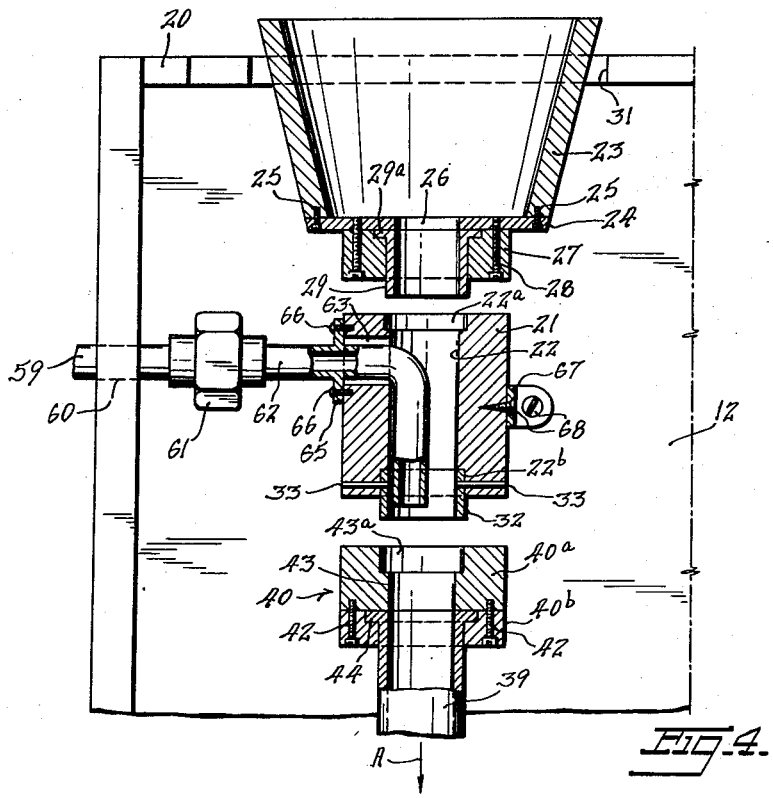
Fig. 4 is an enlarged detailed view of the top portion of Fig. 2 with the parts shown in vertical section and separated from one another.

The pneumatic conveyor for material in a finely divided form, according to the present invention, includes a platform 10 of wood or other material and which is provided on its bottom with four wheels 11. The wheels 11 are preferably of the swivel type so that the platform 10 can have freedom of movement in all directions.

Arranged above the platform 10, there is a housing 12 which has one side open. The housing 12 is made of wood, metal or the like and is shorter than the platform 10 by a distance equal to the thickness of the housing. Extending upward from the platform 10, there is a laterally spaced pair of lugs 14 which are extended into complementary V-shaped cutouts 15, see particularly Fig. 3, formed in the adjacent corner of the housing 12. Pins 16 are extended through the material of the housing 12 and the lugs 14 pivotally support the housing 12 on the platform 10. The pivotal mounting permits the housing 12 to be extended operatively upward from the platform as illustrated in Figs. 1 and 2 and by the full lines in Fig. 3. In that operative position, the lower end of the housing rests on the top face of the platform 10 at the end thereof.

One pair of wheels 11 is located directly below the housing 12 in its operative upwardly extended position for retaining the entire device from tipping over. The housing 12 is retained in its operative upward extended position by a brace 17 which is pivoted at one end to one side wall of the housing 12 by means of a pin 18. The free end of the brace 17 is engageable into a notch 19 in the top face of the platform 10.

When the brace 17 is disengaged from the notch 19, the housing 12 can be pivoted about the pins 16 to a position lowered onto the platform 10, as indicated by the dot and dash lines 12' in Fig. 3. In that position, the open side of the housing 12 is closed by the top face of the platform 10 and the operative size of the conveyor is reduced to be conveniently carried on the coal delivery truck. The end of the housing 12 which is pivotally supported is rounded concentric with the pins 16, as shown most clearly in Fig. 3, to permit pivotal movement of the housing 12 between its operative and inoperative positions. The end of the housing 12, remote from its pivoted end, is provided with a cutout 20, see Figs. 2 and 4, to provide clearance from the free end of the brace 17 in the lowered inoperative position of the housing.

Fixedly mounted within the housing 12 adjacent its free end, there is a tubular entrance block 21. The block 21 is made of metal, wood or the like and has a passageway 22 extended therethrough parallel to the length of the housing 12 to be vertically extended when the housing is in its raised operative position. Connected to the top end of the entrance block 21, there is a hopper 23 which has an open top to receive the finely divided material such as coal. The bottom of the hopper 23 is closed by a wall 24 secured to the hopper 23 by several screws 25, see Fig. 4. The bottom wall 24 has a hole 26 of the same diameter as the passageway 22 of the entrance block 21. Secured to the bottom face of the bottom wall 24, concentric with the hole 26, there is a connector block 27 which is retained in position by several bolts 28. The connector block 27 carries a connector tube 29 of metal which depends below the bottom face of the connector block 27 and into an enlarged portion 22ª formed at the top end of the passageway 22. At its top end, the connector tube 29 has an outwardly extended flange 29ª which is clamped in position between the adjacent faces of the bottom wall 24 and the connector block 27. The connector block 27 is connected to the top end of the tubular entrance block by the usual luggage-type fastener 30, see Fig. 2, which has one-half secured to the outer face of the connector block and the other half secured to the outer face of the entrance block 21.

The hopper 23 is of a height so that when the connector block 27 is mounted in position on the top of the tubular entrance block 21, the top open end of the hopper will be flush with the outer face of the adjacent end wall of the housing 12, see Fig. 2. That adjacent end wall of the housing is formed with a cutout 31 through which the open top of the hopper 23 is exposed to receive the finely divided material.

Depending from the open bottom end of the passageway 22 of the tubular entrance block 21, there is a connector tube 32 of metal. The connector tube 32 has its top end retained in position within an enlarged portion 22ᵇ formed at the bottom end of the passageway 22 by pins 33 extended in from diametrically opposite sides of the tubular entrance block 21.

The connector tubes 29 and 32 have an internal diameter corresponding to the diameter of the passageway 22 of the entrance block 21 so that the material will have free passage through the passageway 22.

Secured in position within the housing 12 beneath the tubular entrance block 21, there is a tubular discharge block 34 constructed of the same material as the entrance block and having a passageway 35. The discharge block 34 is horizontally disposed to have its passageway 35 extended at right angles to the passageway 22 of the entrance block 21. The discharge block 34 is extended through a cutout 36 formed in the side wall of the housing 12 and is retained in position therein by means of an angle iron 37 which has its arms secured to the discharge block 34 and the side wall of the housing 12 by screws 38.

A tube 39 is extended between the bottom of the tubular entrance block 21 and the inner end of the tubular discharge block 34 for carrying the material from the block 21 to the block 34. The tube 39 is flexible in nature and has a connector block 40 at its top end by which it is secured to the bottom end of the tubular entrance block 21 and a connector block 41 at its bottom end by which it is secured to the inner end of the discharge block 34. The connector block 40 is of two part construction to have sections 40ª and 40ᵇ connected together by means of removable bolts 42. The upper section 40ª has a passageway 43 concentric with the passageway 22 of the entrance block 21. At its top end 43ª, the passageway 43 is enlarged to receive the depending bottom portion of the connector tube 32. The top end of the tube 39 is extended through the bottom section 40ᵇ and has an outwardly directed flange 44 clamped in position between the adjacent faces of the sections 40ª and 40ᵇ. The connector block 40 is joined to the tubular entrance block 21 by a releasable luggage-type fastener 45, see Fig. 2, which has one-half secured to the side of the entrance block and the other half secured to the side of the connector block.

Figure 5:
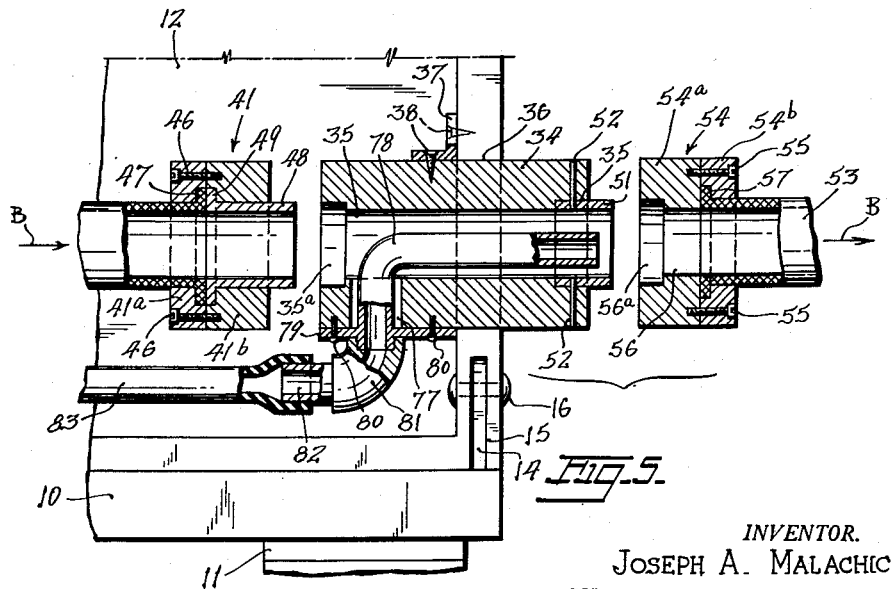
Fig. 5 is an enlarged detailed view of the bottom portion of Fig. 2 with the parts shown in vertical section and separated from one another.

The connector block 41 is also of two part construction to have sections 41ª and 41ᵇ releasably joined together by screws 46, see Fig. 5. The bottom end of the tube 39 is extended through the section 41ª and has an outwardly directed flange 47. A connector tube 48 is extended through the section 41ᵇ and is formed at its inner end with an outwardly extended flange 49. The flanges 47 and 49 are clamped in position between the adjacent faces of the sections 41ª and 41ᵇ of the connector block 41. The connector block 41 is secured to the inner end of the tubular discharge block 34 by a releasable luggage-type fastener 50, see Fig. 2, which has one-half secured to the discharge block 34 and the other half secured to the connector block 41.

The connector tube 48 extends from the section 41ᵇ of the connector block and when that block is secured to the discharge block 34, that projecting end of the tube 48 is received within an enlarged portion 35ª formed at the inner end of the passageway 35 of the discharge block.

The passageway 35 of the discharge block 34 has its outer end continued into an enlarged portion 35ᵇ into which one end of a connector tube 51 is fitted. That connector tube 51 is retained in position in the enlarged portion 35ᵇ of the passageway 35 by several pins 52 extended in from opposite sides of the discharge block 34. As in the case of the tubes 29 and 32, the tubes 48 and 51 have an internal diameter corresponding to the diameter of the passageway 35 so that the material will have an unobstructed path through the passageway.

Extending from the outer end of the discharge block 34, there is a flexible discharge tube 53 for conveying the material from the discharge block. The one end of the discharge tube 53 is joined to the outer end of the discharge block 34 by means of a connector block 54 and the free end of the tube 53 is to be manually held for guiding the piling of the discharging material as may be required.

The connector block 54 is comprised of sections 54ª and 54ᵇ which are releasably joined together by removable screws 55, see Fig. 5. The section 54ª has a passageway 56 which continues at its inner end into an enlarged portion 56ª for receiving the projecting end of the connector tube 51. The adjacent end of the flexible tube 53 is extended through the section 54ᵇ and has an outwardly extended flange 57 which is clamped in position between the adjacent faces of the sections 54ª and 54ᵇ. The connector block 54 is joined to the outer end of the discharge block 34 by a releasable luggage-type fastener 58, see Fig. 2, which has one-half secured to the discharge block 34 and its other half secured to the connector block 54.

Means connected to a source of air under pressure is provided for supplying compressed air to blow the material which is placed within the hopper 23 from the entrance block 21 through the tube 39 and then through the discharge block 34 to discharge from the flexible discharge tube 53. That means includes a pipe 59 which has one end extended through a hole 60 in the side wall of the housing 12. Connected to the inner end of the pipe 59, by means of a union 61, there is an L-shaped air discharge nozzle 62. The nozzle 62 is extended through an enlarged opening 63 formed in the side of the entrance block 21 to have its inner portion extended eccentrically parallel to the axis of the passageway 22. The nozzle 62 is of an external diameter considerably smaller than the diameter of the passageway 22 so that the material can pass about that nozzle. The inner end of the nozzle is positioned to discharge the air under pressure in the direction in which the material flows through the passageway 22, as indicated by the arrow A on Fig. 4.

Connected to the outer end of the pipe 59 is one end of a rubber hose 64 which in turn to be connected to the source of air under pressure, not shown, which is preferably carried on the delivery truck. Externally of the entrance block 21, the nozzle 62 carries a flange 65 which is secured to the block 21 for closing the outer end of the opening 63. The flange 65 is retained in position by several pins 66. Attachment of the nozzle 62 to the entrance block acts in conjunction with an angle iron 67 to fixedly secure the entrance block 21 in position in the housing 12. The angle iron 67 is secured to the back wall of the housing 12 and the adjacent side of the entrance block 21 by means of screws 68.

Connected into the pipe 59, by means of a union 69, between the hose 64 and the side of the housing 12, there is a T-shaped fitment 70 from which a branch pipe 71 extends. Connected in the branch pipe 71, there is a hand controllable valve 72, see Fig. 2. The branch pipe 71 enters the side of the housing 12 through a hole 73 in the adjacent side wall. Within the housing 12, there is connected to the inner end of the branch pipe 71, an elbow 74 and a terminal nipple 75 by means of a union 76.

The tubular discharge block 34 has an aperture 77 in one side thereof, see particularly Fig. 5, through which an auxiliary nozzle 78 is extended into the passageway 35 of the block 34. The auxiliary nozzle 78 is of an external diameter smaller than the diameter of the passageway 35 so that the material can by-pass the outer surfaces of the nozzle and that nozzle has its discharge end facing in the direction in which the material moves through the passageway 35, as indicated by the arrows B on Fig. 5. Externally of the discharge block 34, the auxiliary nozzle 78 is formed with an enlarged flange 79 secured to the outer face of the block 34 by several pins 80.

An elbow 81 is threaded onto the outer end of the auxiliary nozzle 78 and a nipple 82 is threaded into the elbow 81. A length of rubber tubing 83, see Figs. 2 and 5, has its ends fitted over the nipples 75 and 82 for conveying the air under pressure from the branch pipe 71 to the nozzle 78 to discharge therefrom into the tubular discharge block 34 to assist the material in its movement through the passageway 35 of that block.

In operation, the valve 72 is normally left closed so that all of the air under pressure will discharge from the nozzle 62 into the passageway 22 of the tubular inlet block 21. The air under pressure discharging from the nozzle 62 will create a partial vacuum at the entrance to the passageway 22 and suck the material down through the hopper 23 into the passageway 22 and blow it through the tube 39, the passageway 35 of the tubular discharge block 34 and then from the outer end of the flexible discharge tube 53. However, if it is found that the material is not moving fast enough through the discharge tube 53, the valve 72 can be opened to cause the air under pressure to discharge from the auxiliary nozzle 78 within the discharge block 35 and function as a booster to speed the movement of the material through the flexible discharge tube 53.

The operational use of the pneumatic conveyor is best illustrated in Fig. 1 wherein one means is illustrated for using the conveyor to move finely divided coal from a delivery truck 90 into a coal bin in the cellar of a building 92. The truck 90 is backed up to the curb of the sidewalk 93 and its body 94 raised so that the finely divided coal, of the pea or buckwheat sizes, can discharge by gravity from the chute 95 at the rear end of the body. The pneumatic conveyor is positioned on the sidewalk 93 with its housing 12 in a vertical position and with its hopper 23 located below the chute 95 to receive the coal as it drops from the end of the chute. The position of the hopper 23 with relation to the chute 95 is illustrated by the dot and dash lines 95' in Fig. 2. The hose 64 is connected to the source of air under pressure on the truck 90 and the end of the flexible discharge tube 53 is projected into the open cellar window 96. As the coal drops from the chute 95 into the hopper 23 it will be forced to discharge from the end of the discharge tube 53 and the person holding the end of that tube can guide the discharging coal to be evenly distributed within the coal bin 91 instead of permitting it to freely pile up beneath the window 96. If, the coal is discharging too slowly from the end of the discharge tube 53 the valve 72 can be opened to discharge additional air from the auxiliary nozzle 78 and speed the discharge of the coal from the discharge tube 53.

When all the coal has been delivered, the conveyor can be collapsed by releasing the brace 17 and pivoting the housing 12 to rest down on the platform 10 so that the conveyor can be conveniently carried, while occupying very little space, upon the truck 90. While the conveyor is illustrated in position directly beneath the chute 95 of the truck, it is appreciated that the conveyor can be positioned more closely to the cellar window with the usual extension chutes being used to convey the coal from the chute 95 into the hopper 23 of the conveyor. The usual hingedly mounted gate on the body 95 at the discharge opening into the chute 95 is used to control the flow of the coal from the body 94 at such a rate that it will feed down in the hopper 23 without spilling over the side thereof.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A pneumatic conveyor for material in a finely divided form, comprising a platform, a housing pivotally mounted on said platform to be extendable upright from said platform, a tubular entrance block mounted within said housing and having a hopper for receiving the material, said entrance block and hopper being in vertical alignment, a tubular discharge block mounted within said housing remote from said entrance block, a tube connecting said entrance block to said discharge block, a flexible discharge tube leading from said discharge block to be manually held at its free end for guiding the discharge of the material therefrom, and means extending downwardly within the upper end of said entrance block and connected to a source of air under pressure for supplying compressed air to blow the material from said entrance block through said first tube and said discharge block to discharge from the end of said discharge tube.

2. A pneumatic conveyor for material in a finely divided form, comprising a platform, a housing pivotally mounted on said platform to be extendable upright from said platform, a tubular entrance block mounted within said housing and having a hopper for receiving the material, said entrance block and hopper being in vertical alignment, a tubular discharge block mounted within said housing remote from said entrance block, a tube connecting said entrance block to said discharge block, a flexible discharge tube leading from said discharge block to be manually held at its free end for guiding the discharge of the material therefrom, and means extending downwardly within the upper end of said entrance block and connected to a source of air under pressure for supplying compressed air to blow the material from said entrance block through said first tube and said discharge block to discharge from the end of said discharge tube, said hopper being separate from said tubular entrance block and a connected block on said hopper by which it is releasably connected to the entrance block to discharge into a passageway of the block.

3. A pneumatic conveyor for material in a finely divided form, comprising a platform, a housing pivotally mounted on said platform to be extendable upright from said platform, a tubular entrance block mounted within said housing and having a hopper for receiving the material, said entrance block and hopper being in vertical alignment, a tubular discharge block mounted within said housing remote from said entrance block, a tube connecting said entrance block to said discharge block, a flexible discharge tube leading from said discharge block to be manually held at its free end for guiding the discharge of the material therefrom, and means extending downwardly within the upper end of said entrance block and connected to a source of air under pressure for supplying compressed air to blow the material from said entrance block through said first tube and said discharge block to discharge from the end of said discharge tube, said first tube having connector blocks at its ends by which it is connected to said entrance block and said discharge block.

4. A pneumatic conveyor for material in a finely divided form, comprising a platform, a housing pivotally mounted on said platform to be extendable upright from said platform, a tubular entrance block mounted within said housing and having a hopper for receiving the material, said entrance block and hopper being in vertical alignment, a tubular discharge block mounted within said housing remote from said entrance block, a tube connecting said entrance block to said discharge block, a flexible discharge tube leading from said discharge block to be manually held at its free end for guiding the discharge of the material therefrom, and means extending downwardly within the upper end of said entrance block and connected to a source of air under pressure for supplying compressed air to blow the material from said entrance block through said first tube and said discharge block to discharge from the end of said discharge tube, said supply means comprising a nozzle entered into said entrance block through an opening in the side thereof, a pipe connected to said nozzle and projected from the side of said housing, and a hose connected to the outer end of said pipe and connected at its other end to said source of air under pressure, an auxiliary nozzle entered into said discharge block through an opening in the side thereof, and a branch pipe connected at one end to said first pipe between said hose and said housing, said branch pipe having its other end extended into in spaced parallel relation thereto said housing and connected to the outer end of said auxiliary nozzle.

5. A pneumatic conveyor for material in a finely divided form, comprising a platform, a housing pivotally mounted on said platform to be extendable upright from said platform, a tubular entrance block mounted within said housing and having a hopper for receiving the material, said entrance block and hopper being in vertical alignment, a tubular discharge block mounted within said housing remote from said entrance block, a tube connecting said entrance block to said discharge block, a flexible discharge tube leading from said discharge block to be manually held at its free end for guiding the discharge of the material therefrom, and means extending downwardly within the upper end of said entrance block and connected to a source of air under pressure for supplying compressed air to blow the material from said entrance block through said first tube and said discharge block to discharge from the end of said discharge tube, said supply means comprising a nozzle entered into said entrance block through an opening in the side thereof, a pipe connected to said nozzle and projected from the side of said housing, and a hose connected to the outer end of said pipe and connected at its other end to said source of air under pressure, an auxiliary nozzle entered into said discharge block through an opening in the side thereof, and a branch pipe connected at one end to said first pipe between said hose and said housing, said branch pipe having its other end extended into in spaced parallel relation thereto said housing and connected to the outer end of said auxiliary nozzle, and external flanges on said nozzles secured to the outer faces of said blocks closing the openings in said blocks through which said nozzles pass.

References Cited in the file of this patent

UNITED STATES PATENTS

| Number | Name | Date |
|---|---|---|
| 749,206 | Limbert | Jan. 12, 1904 |
| 758,118 | Sticker | Apr. 26, 1904 |
| 1,173,073 | Williams | Feb. 22, 1916 |
| 1,189,328 | Williams | July 4, 1916 |
| 1,697,584 | Aikins | Jan. 1, 1929 |
| 2,419,410 | Maurer | Apr. 22, 1947 |
| 2,532,064 | Huddle | Nov. 28, 1950 |
| 2,588,711 | Everett | Mar. 11, 1952 |
| 2,591,411 | Delsman | Apr. 1, 1952 |